Dec. 10, 1968 C. R. MINER ET AL 3,415,127

TURRET TUNER FOR UHF TELEVISION AND OTHER PURPOSES

Filed March 20, 1967 5 Sheets-Sheet 1

INVENTORS
CARROLL R. MINER
JOHN L. FRANKE

BY James and Franklin

ATTORNEYS

TURRET TUNER FOR UHF TELEVISION AND OTHER PURPOSES

Filed March 20, 1967

5 Sheets-Sheet 2

INVENTORS
CARROLL R. MINER
JOHN L. FRANKE

BY James and Franklin

ATTORNEYS

TURRET TUNER FOR UHF TELEVISION AND OTHER PURPOSES

Filed March 20, 1967 5 Sheets-Sheet 3

INVENTORS
CARROLL R. MINER
JOHN L. FRANKE
BY James and Franklin
ATTORNEYS

TURRET TUNER FOR UHF TELEVISION AND OTHER PURPOSES
Filed March 20, 1967 5 Sheets-Sheet 4
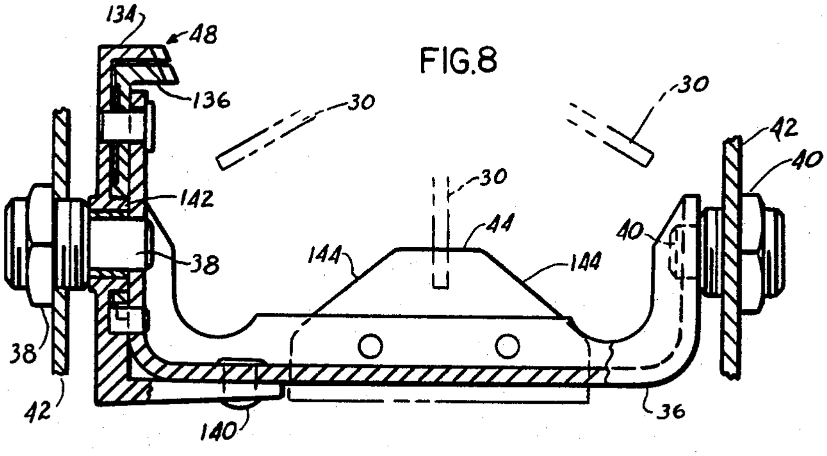
FIG.8
FIG.9A
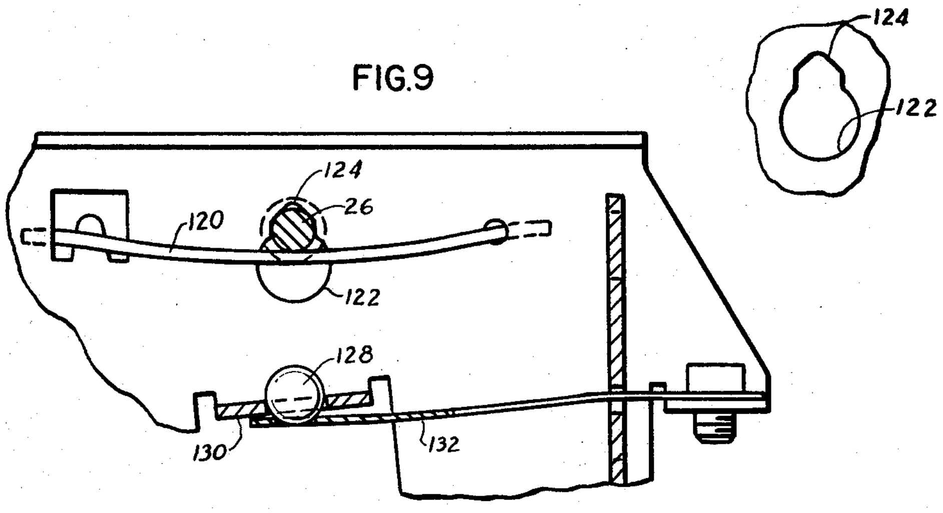
FIG.9
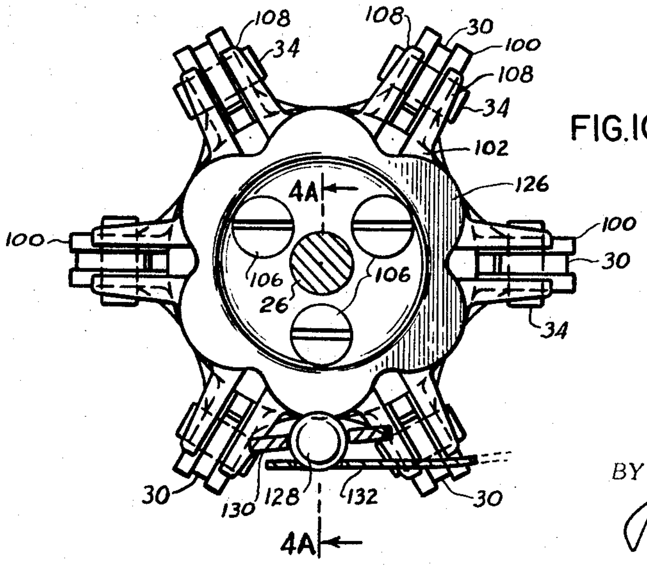
FIG.10
INVENTORS
CARROLL R. MINER
JOHN L. FRANKE
BY James and Franklin
ATTORNEYS

TURRET TUNER FOR UHF TELEVISION AND OTHER PURPOSES

Filed March 20, 1967

5 Sheets-Sheet 5

INVENTORS
CARROLL R. MINER
JOHN L. FRANKE

BY James and Franklin

ATTORNEYS

United States Patent Office 3,415,127 Patented Dec. 10, 1968

1 2

3,415,127

TURRET TUNER FOR UHF TELEVISION AND OTHER PURPOSES

Carroll R. Miner, Wilbraham, and John L. Franke, Fairview, Mass., assignors to General Instrument Corporation, Newark, N.J., a corporation of New Jersey Filed Mar. 20, 1967, Ser. No. 624,608
21 Claims. (Cl. 74—10.6)

ABSTRACT OF THE DISCLOSURE

A continuously variable tuner, such as a ganged tuning capacitor for the tuning of a UHF television receiver, is accurately indexed by means of a detented turret having a fixed axis. The turret has angularly spaced cams projecting outward, one or another of which bears against collateral cam followers on a rocker having a fixed axis which is perpendicular to and spaced from the turret axis. The rocker is geared to the rotatable shaft of the tuning capacitor. The turret knob is supplemented by a fine tuning knob with high ratio reduction gearing for independent precision adjustment of the angle of that cam which is then engaging the cam followers. The fine tuning is continuously available during reception.

*Background of the invention*

VHF tuners for television receive only a limited number of channels, and the tuner is essentially a switching device which switches to one or another of different impedances to provide the desired tuned circuits for each channel.

However, a UHF tuner provides continuous rather than step-by-step tuning, because there are so many, say seventy channels. The frequency may range from say 470 to 890 megacycles. In any one locality there may be only a small number of channels in actual use, but the tuning must be very gradual and precise, because otherwise a desired station may be missed altogether. With so many channels it is not feasible to have different fixed impedances as is done with UHF. A tuning knob must have a high-ratio gear reduction in order to successfully locate a desired station, but this will require what seems like interminable rotation to change from one station to some other desired station. On the other hand, a low gear ratio is not feasible because a person operating the tuner may pass the desired station.

*Summary of the invention*

The present improvement is a detented turret-type control which affords indexing instantly from one local channel to another local channel, with great precision. The turret is rotatable about a fixed axis, and has detent means to index it to a number of angularly spaced positions. Cams are distributed around and project outwardly from the turret, and means is provided to fixedly adjust the angular position of each cam about an axis which is perpendicular to and spaced from the turret axis. A rocker is disposed adjacent the turret, and is tiltable about a fixed axis which is perpendicular to and spaced from the turret axis. The rocker has two spaced cam followers positioned to be slidably engaged by one or another of the cams as the turret is indexed, and the rocker is mechanically connected to the continuously variable tuning element in order to vary the tuning of the same in detented steps. The tuning element here shown is a ganged variable capacitor.

The axis of the rocker preferably coincides with the axis of that cam which has been indexed to engage the rocker. The inner part of each cam is a worm gear sector meshing with a worm carried by the turret, each of said worms having a pinion at one end. A fine tuning knob operates a train of high-ratio reduction gearing for engaging the pinion of that worm whose cam is then engaging the rocker. In this way each cam may be tuned to a desired station, for future selection by simply indexing the detented turret. In preferred form, the fine tuning knob is coaxial with and located immediately behind the turret knob, and there is a "monkey motion" such that the fine tuning gear train is normally disengaged, as when indexing the turret by means of the turret knob for station selection, but is automatically brought into engagement whenever the fine tuning knob is operated. There are bias spring mechanisms at each of the numerous places where there might otherwise be clearance or lost motion. This is important because even a minute error in tuning will cause a UHF station to be missed altogether.

The foregoing and additional features are described in the following detailed specification, which is accompanied by drawings in which:

FIG. 8 is a vertical section through the rocker;

FIG. 9 is a fragmentary section taken approximately on the line 9—9 of FIG. 4, and illustrates the spring action at the turret bearing shafts, and at the detent ball;

FIG. 9A is a fragmentary view showing the configuration of the bearing hole for the turret shaft;

FIG. 10 is a rear end view of the turret taken approximately on the line 10—10 of FIG. 4;

Figures 1, 2:
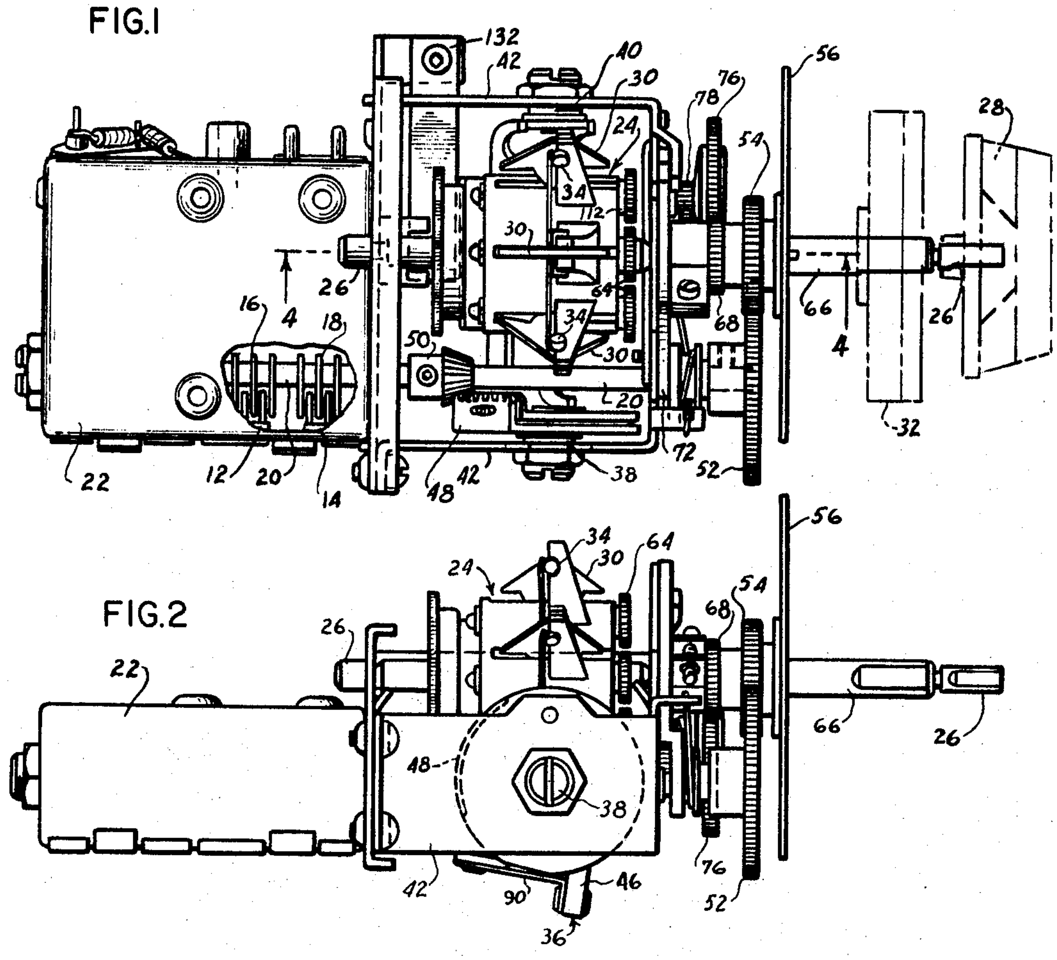
FIG. 1 is a top view of a tuner embodying features of the present invention.
FIG. 2 is a side elevation of the same.
Figure 3:
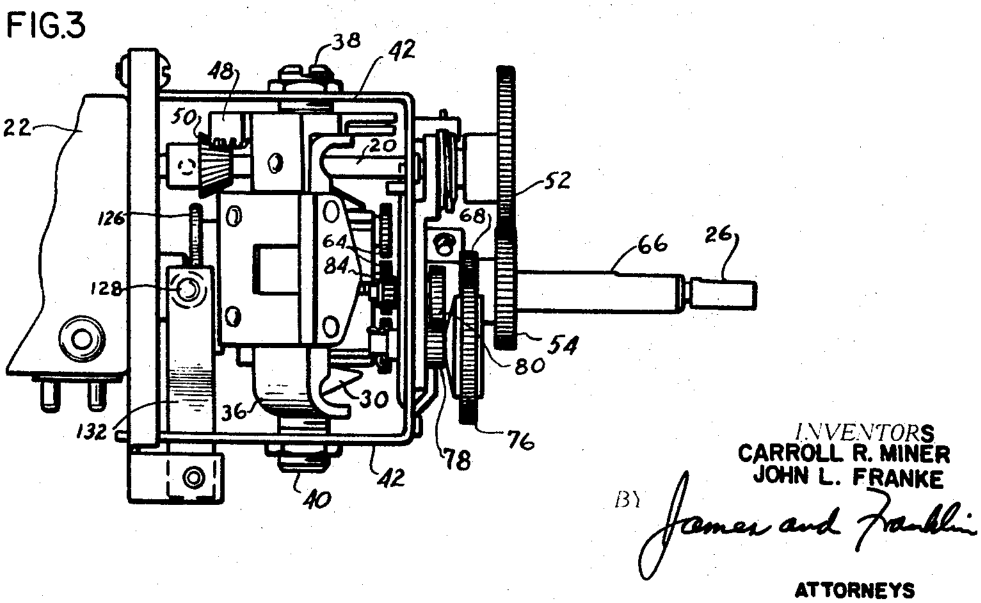
FIG. 3 is a bottom view of the tuner, with the ganged condenser and associated circuitry elements broken away.

Referring to the drawing, and more particularly to FIG. 1, the variable tuning element in this case is a ganged variable capacitor. It comprises sets of fixed plates 12 and 14 etc., which are variably interleaved by sets of rotatable plates 16 and 18 etc., mounted on a common shaft 20, which usually rotates for about 180° to change from minimum capacitance to maximum capacitance. This variable capacitor is carried in a housing 22 (FIGS. 1, 2 and 3) which contains additional circuitry elements and appropriate vacuum tubes and/or transistors. Because one-half rotation of the shaft 20 covers some seventy channels, it must be turned very gradually or if indexed, the indexing must be exceedingly accurate.

In accordance with the present improvement, we provide a turret 24 which is rotated by a turret shaft 26 turned by a turret knob or station selector knob 28 (FIG. 1) usually located at the front of the television receiver. The turret may be turned with a detent action to any one of a number of angularly spaced positions, in this case six positions, for the selection of six channels. The turret 24 has six cams 30 distributed therearound at uniform intervals of 60°, as is best shown in FIG. 10. A means is provided, preferably a fine tuning knob 32 (FIG. 1) and high ratio reduction gearing, to fixedly adjust the angular position of each cam 30 about an axis indicated at 34 in FIGS. 2 and 4, this axis being perpendicular to and spaced from the turret shaft 26. A rocker, generally designated 36 (FIG. 3), is tiltable through a limited angle, say 60°, about a fixed axis which is perpendicular to and spaced from the turret axis. More specifically, the rocker 36 is carried by adjustable bearings 38 and 40 (FIGS. 1, 2, 3 and 8), these being secured in the upright walls 42 of a rigid frame in which the turret and rocker are mounted.

Figures 4, 4A:
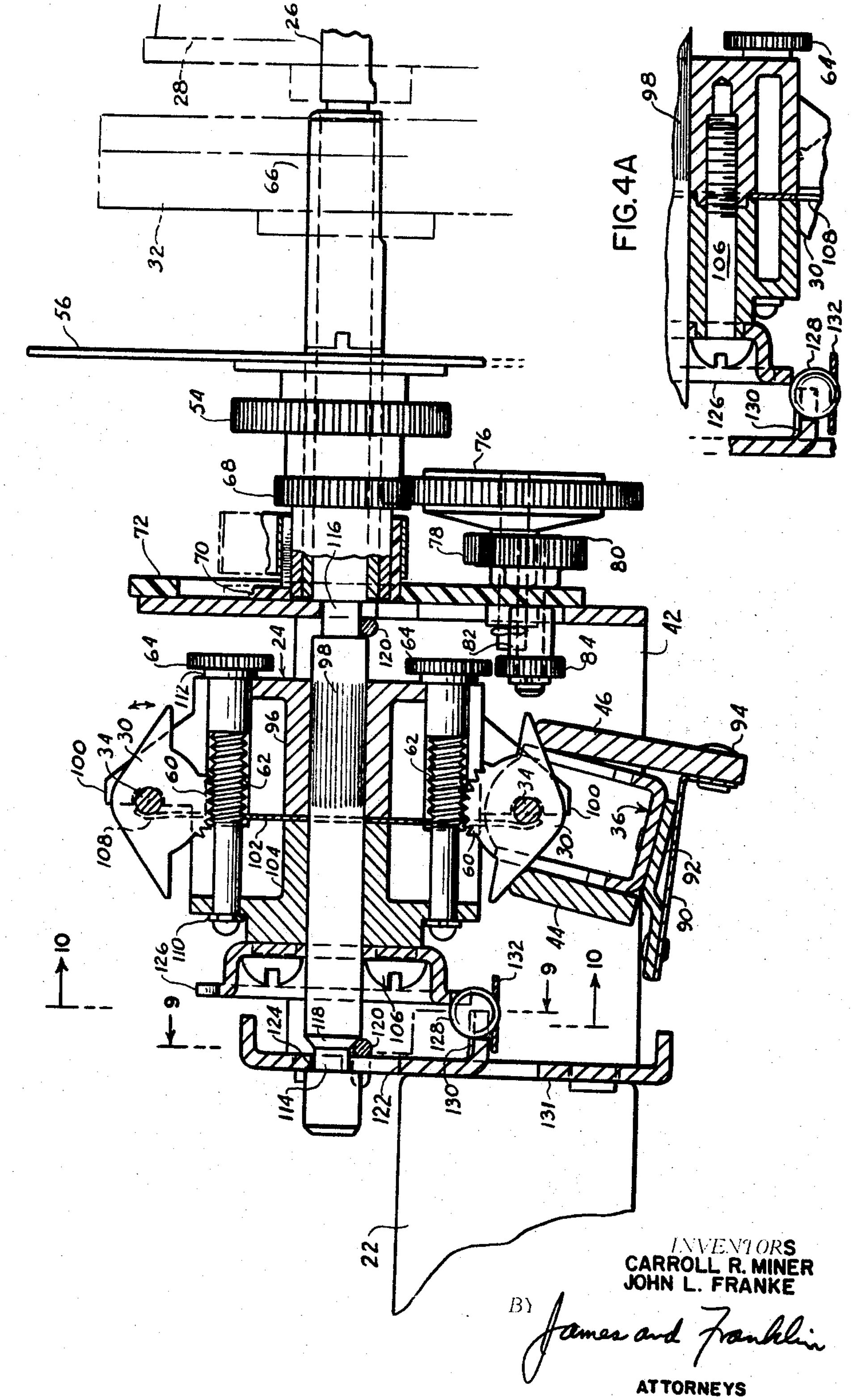
FIG. 4 is a vertical section drawn to enlarged scale, and taken approximately on the line 4—4 of FIG. 1.
FIG. 4A is a fragmentary section through another part of the turret, taken on the line 4A—4A in FIG. 10.

Referring now to FIG. 4 the rocker 36 has two spaced cam followers positioned to be engaged by one or another of the cams 30 as the turret 24 is indexed. One of the cam followers, in this case cam follower 44, is solid, that is, it is fixedly mounted on the rocker, and the other cam follower, in this case the cam follower 46, is sprung, that is, it is resiliently urged toward cam follower 40 to avoid clearance or lost motion between the cam 30 and the cam followers 44 and 46.

Figures 5, 6:
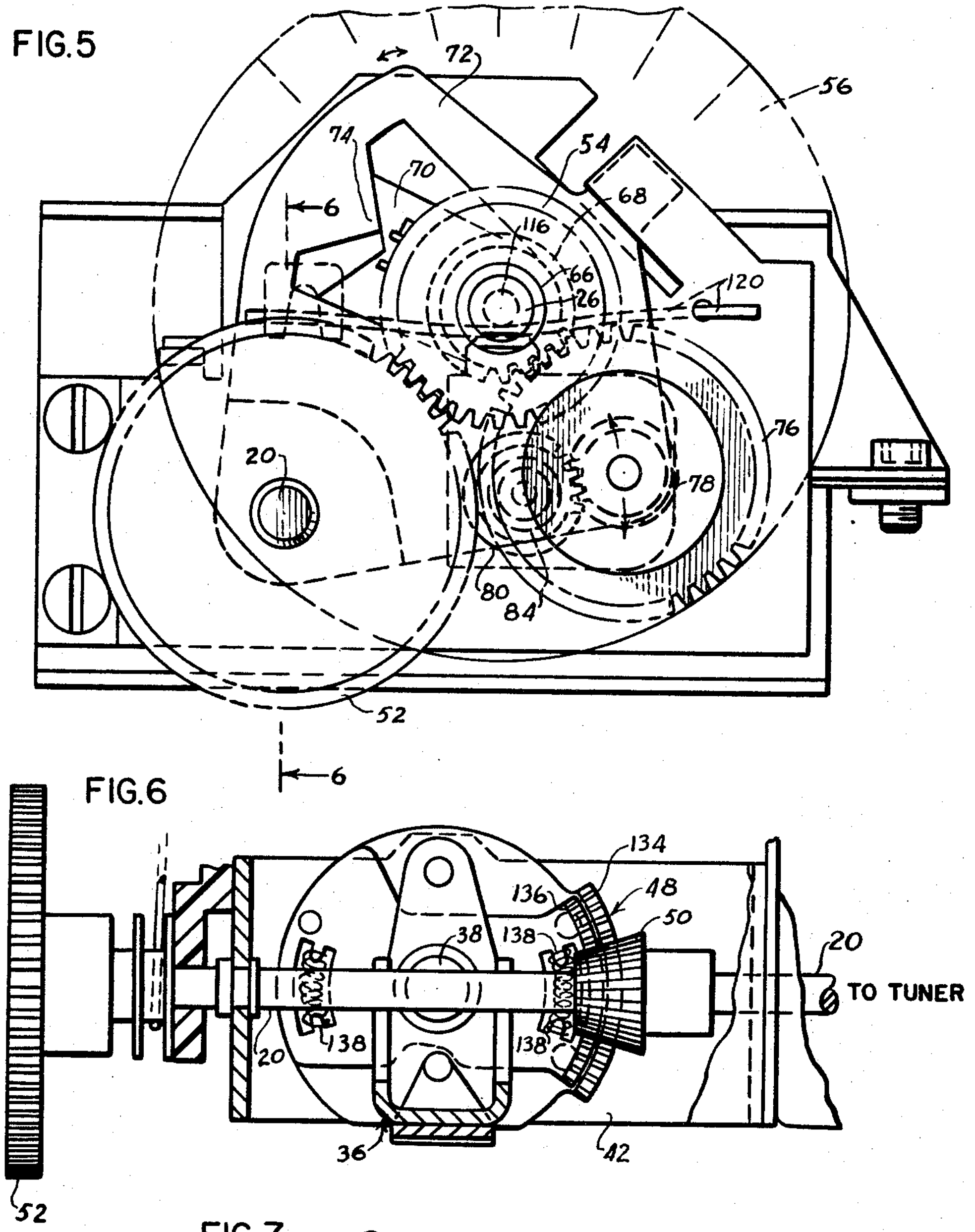
FIG. 5 is a front elevation drawn to enlarged scale.
FIG. 6 is a fagmentary vertical section taken approximately on the line 6—6 of FIG. 5, and shows bevel gearing which connects the rocker to the shaft of the tuning capacitor.

Reverting to FIG. 1, and referring also to FIG. 6, the rocker is mechanically connected to vary the tuning of the variable capacitor, and in the present case, the rocker has a bevel gear sector 48 meshing with a bevel gear pinion 50 secured to the shaft 20 of the variable capacitor. A step up ratio of say three to one provides the desired 180° rotation of shaft 20. In FIGS. 1 and 6 it will be seen that the shaft 20 is extended forwardly toward the tuning knobs (28 and 32 in FIG. 1), and is used to provide an indication of the channel being selected. More specifically, at its forward end the shaft 20 turns a gear 52 meshing with the gear 54 on the hub of an indicator wheel 56 (FIGS. 1, 2 and 5) the front face of which near its periphery may carry appropriate channel designations. A step-up ratio of two to one causes the half rotation of the capacitor to provide full rotation of the indicator disc 56.

Referring now to FIG. 4, the axis about which the rocker 36 tilts preferably coincides with the axis 34 about which the cam 30 tilts, so that the parts may turn in unison during fine tuning. The cam followers 44 and 46 are collateral, and extend generally in the direction of the axis of the rocker. They are slidingly engaged by the cams 30 as the turret is being rotated.

For adjustment of the angle of a cam 30 the inner part of the cam is toothed and acts as a worm gear sector indicated at 60, and this meshes with a worm or screw 62 carried by the turret and disposed parallel to the axis of the turret. Each of the worms 62 has a pinion 64 at one end, in this case the forward end, and the fine tuning knob (32 in FIGS. 1 and 4) operates a train of reduction gearing for engaging the pinion 64 of that worm 62 whose cam 30 is then engaging the rocker 36. With the tuner positioned as here shown, this is the bottom pinion and cam, the rocker being at the bottom. However, the tuner may be positioned as desired.

Figure 7:
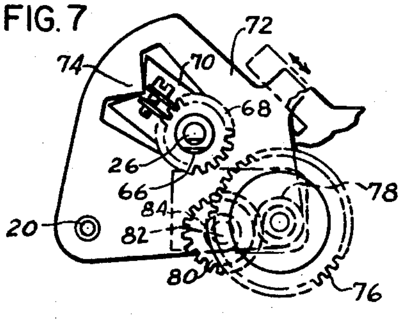
FIG. 7 is a view like FIG. 5, taken behind the indicator gears, and drawn to smaller scale.

The gear train for fine tuning is preferably normally disengaged, and comes into engagement only when operating the fine tuning knob. For this purpose a so-called "monkey motion" is employed. The fine tuning knob 32 turns a sleeve 66 which extends rearwardly to a gear 68 and a frictionally turned finger 70. Referring now to FIG. 7, the finger 70 is movable for a limited distance within a gear plate 72, which oscillates about shaft 20 as a center. The angular relation at 74 causes a counterclockwise or lifting movement of plate 72 when the finger 70 moves in either direction, that is, whenever the fine tuning knob is used.

Gear plate 72 carries a compound gear including gear 76 and its pinion 78. The latter meshes with a gear 80 mounted on a short shaft 82 which passes through the gear plate and which, at its inner or rear end, carries a pinion 84.

FIG. 4 also shows gears 68 and 76, the latter having pinion 78 meshing with gear 80, the shaft 82 of which at its inner end carries the pinion 84. This pinion is below the gear 64 at the end of the lowermost worm 62. In FIGS. 4 and 7 the reduction gearing is shown in disengaged position.

When the fine tuning knob is turned, the gears shown in FIGS. 4 and 7 rise with the gear plate 72, thus bringing gear 76 (FIG. 7) into mesh with gear 68, and at the same time bringing pinion 84 (FIG. 4) into mesh with gear 64. FIG. 5 shows the gears in their raised or operative position. When the fine tuning knob is released the gear plate and gears drop to their inoperative rest position.

The slight angular motion of the finger 70 is frictional, and the amount of friction may be adjusted by means of a split collar having an adjusting screw, as will be seen in FIGS. 1, 2, and 7.

The high ratio step down gearing for fine tuning, in this case about 200 to 1 from knob 32 to cam 30, is of value not only for gradual tuning, but also for reduced torque. If the torque were high the gearing might disengage at the movable gear plate 72, instead of remaining in engagement as desired.

It should be noted that the adjustment at each cam is entirely independent of the adjustment of the other cams. It is also independent of the frequency separation of the channels, and of course is independent of the angular separation around the turret.

In FIG. 4 the solid cam follower 44 is fixedly secured to the rocker 36, while the cam follower 46 is sprung or resiliently urged toward the cam follower 44. For this purpose a spring 90 is carried by a bracket 92 which is riveted to the rocker, and which spring is itself riveted at 94 to the cam follower 46. Inasmuch as the two working sides of the cam 30 are disposed at an angle, it will be seen that the relatively sprung relation of the cam followers takes up any clearance or lost motion which might otherwise exist between the cams and cam followers.

The construction of the turret also avoids lost motion at the pivots of the individual cams. Each cam has trunnions formed by a short shaft 34 (FIG. 10) which is driven through the cam with a force fit. The forward half 96 (FIG. 4) of the turret is driven on the turret shaft 26 with a force fit, and for this purpose the shaft may be preliminarily ridged or knurled, as indicated at 98. The part 96 of the turret has six pairs of outwardly projecting bearing ears 100, and these have open-ended or recess-like bearings to receive the trunnions. The trunnions are held in the open bearings by means of a stiff spring disc 102, this being tightly clamped between the forward half 96 and the rear half 104 of the turret.

The two halves of the turret are drawn together by means of screws 106, one of which is best shown in FIG. 4A. There are three such screws, the heads of which are shown in FIG. 10. The spring plate 102 has six pairs of outwardly projecting spring fingers, best shown at 108 in FIG. 10. These bear tightly against the trunnions 34, thus pivoting the cams without lost motion, it being understood that the fingers 108 are put under stress when the two parts of the turret are drawn together by the assembly screws 106. This arrangement greatly facilitates manufacture and assembly of the turret, in addition to eliminating lost motion at the trunnion bearings. The trunnion bearings are preferably elongated radially, and the tips of the spring fingers are preferably somewhat curved around the trunnions, as shown in broken lines in FIG. 4. When a cam bears against the cam followers 44 and 46 of the rocker 36, the clearance is taken up until the teeth of the gear sector 60 of the cam are pressed tightly into the thread of worm 62.

Figure 13:
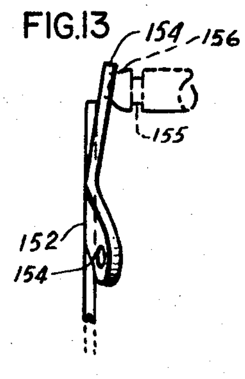
FIG. 13 is a fragmentary edge view drawn to larger scale.

The worms 62 are slid into the turret from front to rear, and are held in position as by means of snap rings 110 (FIG. 4) received in mating grooves near the rear end of the worm shaft. (FIG. 13 shows such a groove at 155.) Any axial movement of the worm would represent lost motion which it is desirable to avoid. For this purpose a spring thrust washer 112 (FIG. 4) is provided at the forward end of each worm, thus guarding against lost motion in axial direction. In FIG. 4, washer 112 is shown schematically, without its sinuous or other such resilient configuration.

The turret shaft 26 (FIG. 4) has spaced neck journals at 114 and 116. Journal 114 has one sloping side or shoulder indicated at 118. A heavy spring wire 120, best shown in FIG. 9, urges the shaft upward and eliminates lost motion both in radial and axial directions. For this purpose the bearing hole which receives the shaft is somewhat keyhole-shaped, it being enlarged at the bottom to readily receive the large diameter of the shaft where it has not been necked. The bearing hole is separately indicated at 122 in FIG. 9A, and the upper or smaller part of the bearing preferably has angularly related sides 124 against which the journal portion of the shaft is pushed by the spring 120 (FIG. 9). The journal 116 has no sloping side, but has axial clearance, and is similarly urged radially by a spring 120.

To detent the turret as it is being indexed to any one of its six rest positions, a detent disc 126 is provided, this having a scalloped periphery as is best shown in FIG. 10. A spring pressed ball 128 bears upwardly against the scalloped disc. The ball is located by a slotted plate 130 which is struck inward from the end plate 131 (FIG. 4). The ball 128 is pressed upward by a leaf spring 132 (FIGS. 3, 4, 9 and 10). FIG. 10 shows the turret between stop positions, that is, with the ball 128 depressed. The detent disc 126 is secured to the rear end of the turret by the same three screws 106 which hold the turret assembled.

In FIG. 4 it will be seen that the ball 128 is offset somewhat in axial direction from the disc 126 so that the ball exerts an axial force, that is, it urges the turret forward, in addition to providing the desired detent action.

The rocker motion is applied to the capacitor shaft 20 by means of bevel gearing, and here again backlash is eliminated. Referring to FIGS. 6 and 8, the bevel gear sector 48 has a solid part 134 which is fixedly secured to the rocker 36, and a sprung part 136 which is slightly rotatable relative to the solid part 134. Compression springs 138 are provided to move the teeth apart while they are in mesh with the bevel pinion 50, thereby eliminating any lost motion or backlash in the bevel gearing itself. FIG. 8 shows how the solid part 134 of the bevel gear sector is riveted at 140 to the rocker 36, while the sprung part 136 of the bevel gear sector is movable about the hub 142 of the solidly secured sector 134.

As here illustrated the sprung part of the bevel gear is outside the solid part, but this may be reversed, that is, the solid part may be inside, and the sprung part outside the solid part.

FIG. 8 also shows how the cam follower 44 has sloping ends indicated at 144 thus facilitating the sweeping or sliding action of the cams 30 as the turret is rotated in either direction. The same is true of cam follower 46 (FIG. 4).

Reverting to FIG. 4, the top edges of the cam followers 44 and 46 are preferably bevelled somewhat to mate with the sloping edges of the cam 30. The points of contact are preferably on a line which passes through the cam axis or trunnion 34.

It may be mentioned that the cams could be straight instead of having edges disposed at an obtuse angle as shown, but it is preferred to use the angular configuration because it provides more effective actuation of the rocker, especially when changing from one extreme angle to the other.

To indicate the selected channel the variable capacitor shaft 20 (FIGS. 1 and 6) is extended forward, and carries a gear 52 meshing with a gear 54 which carries a suitable indicator disc 56, as previously explained. It is convenient but not essential to make the parts concentric as here shown. With this concentric arrangement it should be understood that the main turret knob 28 turns a solid shaft 26 extending through the turret; that the fine tuning knob 32 turns a sleeve 66 which is around shaft 26 and which extends back to the gear 68 and the frictional finger 70 for fine tuning; and that the gear 54 and disc 56 themselves form a short sleeve or large diameter hub which is freely rotatable around the sleeve 66.

Figure 11:
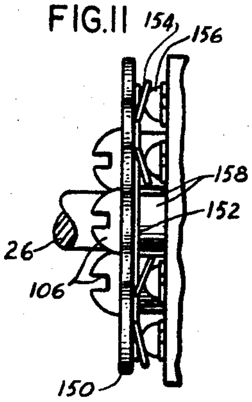
FIG. 11 is a fragmentary elevation showing a modified form of detent disc and resilient spider for holding the adjusting worms against axial movement.
Figure 12:
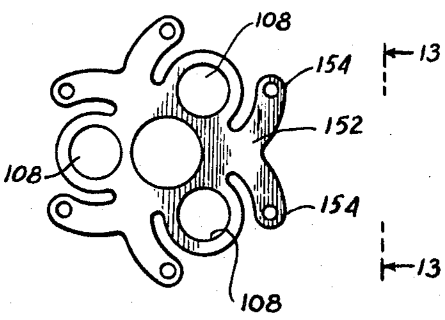
FIG. 12 is an elevation of the resilient spider.

FIGS. 11, 12 and 13 show a slight modification at the rear end of the turret. In this case the detent disc 150 is a flat disc which replaces the somewhat cup-shaped disc 126 shown in FIGS. 4 and 10. A spring disc or spider 152 is disposed immediately within the detent disc 150, and this spring disc has six arms 154 spaced equally around the circle, and suitably located to bear resiliently against the rear ends 156 of the six worms previously described at 62 in FIG. 4. The detent disc 150 and spider 152 are spaced rearward by three spacers, one of which is indicated at 158 in FIG. 11. The rear ends of the spacers may be stepped or shouldered to receive holes 108 in the spider (FIG. 12). The discs are held on the turret by the same three assembly screws 106 previously referred to. In FIG. 4 it will be recalled that there were small spring thrust washers 112 to avoid axial clearance at the forward ends of the worms 62. These washers are unnecessary in the modification of FIGS. 11 and 12, being replaced by the spring arms 154 of the spider 152. The arms may have holes which bear against the rounded rear ends 156 of the worms.

Figure 14:
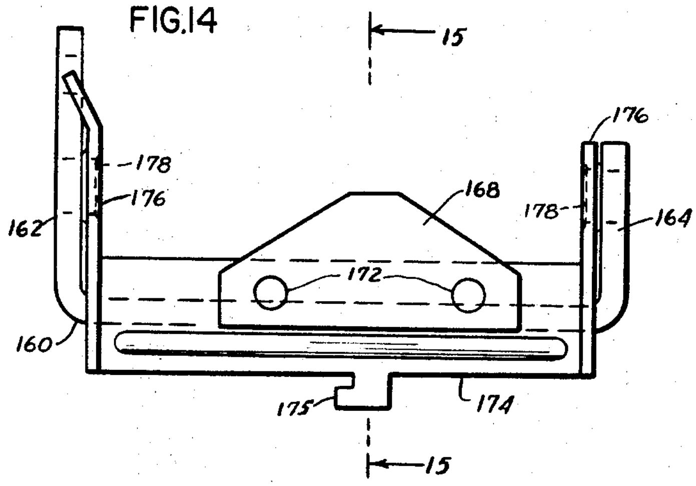
FIG. 14 is an elevation of a modified rocker.

A modified form of rocker may be described with reference to FIGS. 14, 15 and 16. The main part of the rocker is shown at 160, it having upwardly bent ends 162 and 164 which receive bearings or pivots like those shown at 38 and 40 in FIGS. 3 and 8. The bearings are externally threaded for axial adjustment, and the adjustment is locked by means of lock nuts in accordance with known practice. The end 162 is lengthened because it receives the bevel gear sector previously described in connection with FIGS. 1 and 6.

The rocker again has two spaced cam followers, the follower 166 being solid, and the follower 168 being sprung. In this case a bent wire torsion spring 170 is employed, instead of the leaf spring 90 shown in FIG. 4. The sprung follower 168 is riveted at 172 to a sheet metal carrier 174 having ends 176 which fit around the bearing pivots which will be located at 178 (FIG. 15). The pivots, not shown in FIGS. 14 and 15, are the same as pivots 38 and 40 in FIGS. 3 and 8. The solid follower 166 is secured directly to the rocker 160 (FIGS. 15 and 16). The latter has a bracket 180 riveted thereto at 182. This bracket has an end lug 184 on which the loop 186 (FIG. 16) of the torsion spring 170 is anchored. It has another lug 188 against which one arm of the spring bears. The carrier 174 receives the force of the other arm of the torsion spring, and may have a lug 175 for safety.

Figure 15:
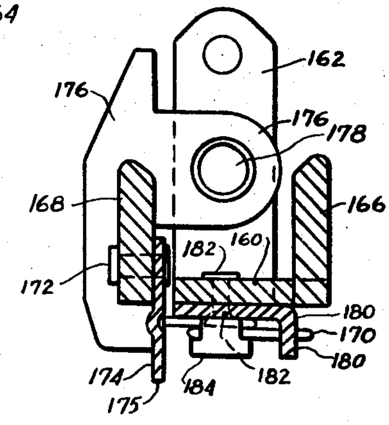
FIG. 15 is a transverse section taken on the line 15—15 of FIG. 14.
Figure 16:
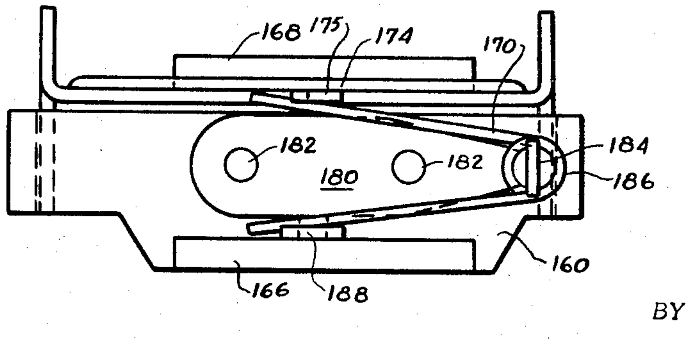
FIG. 16 is a bottom view of the modified rocker.

As before the cam followers preferably have bevelled edges, best shown in FIG. 15, to better mate with the turret cams. They are made separately from the body of the rocker and carrier, because they are preferably made of a hardened tool steel.

It will be evident from the drawing that the action of the torsion spring is to turn cam follower 168 about the pivot at hole 178, in that direction which takes up any clearance which might otherwise exist between the bottom turret cam, and the cam followers of the rocker. This also causes downward movement of the bearing 178, which has a convergent top portion (FIG. 15) to avoid lost motion. This is also done for rocker 36 in FIGS. 3 and 8.

It is believed that the construction and operation of our improved turret tuner, as well as the advantages thereof, will be apparent from the foregoing detailed description. The turret is indexed, and the fine tuning knob is used to select a desired station. This is done for each of six stations. Thereafter simple indexing of the turret will tune the continuously variable element, such as a ganged capacitor, to proper position. The fine tuning knob is continuously available and may be resorted to at any time, should it be desired to slightly correct the tuning of the same channel, or to select a different channel. Spring bias mechanisms are provided at places where there might otherwise be clearance or lost motion, thus providing enough precision for UHF television tuning, where even a slight error would easily cause a UHF station to be missed altogether.

We claim:

1. A tuner comprising a turret which is rotatable about a fixed axis, detent means such that the turret may be indexed to a number of angularly spaced positions, cams distributed around and projecting outwardly from the turret, means to fixedly adjust the angular position of each cam about an axis perpendicular to and spaced from the turret axis, a rocker tiltable about a fixed axis perpendicular to and spaced from the turret axis, said rocker having two spaced cam followers positioned to be engaged by one or another of said cams as the turret is indexed, and means connecting said rocker to a continuously variable tuning element in order to vary the tuning of the same in detented steps.

2. A tuner as defined in claim 1, in which the axis of the rocker substantially coincides with the axis of that cam which has been indexed to engage the rocker, and in which the cam followers are collateral and extend generally in the direction of the axis of the rocker, said cam followers being slidably engaged by said cams as the turret is rotated.

3. A tuner as defined in claim 2, in which the inner part of each cam has a worm gear sector meshing with a worm carried by the turret, each of said worms having a gear, and in which there is a fine tuning knob and a train of reduction gearing driven thereby for engaging the gear of that worm whose cam is then engaging the rocker.

4. A tuner as defined in claim 3, in which the turret has a turret shaft with a turret knob, and in which there is a fine tuning knob behind the turret knob and mounted on a sleeve around the turret shaft, and in which the said train of reduction gearing is driven by said sleeve, and includes means such that the gearing is normally disengaged but is automatically brought into engagement when the fine tuning knob is operated.

5. A tuner as defined in claim 4, in which each cam has two angularly related sides disposed at an obtuse angle, and in which one cam follower of the rocker is solid and the other is sprung, and in which the rocker has resilient means urging the sprung cam follower toward the solid cam follower in order to avoid lost motion between the cams and the cam followers.

6. A tuner as defined in claim 5, in which the turret is provided with resilient means urging each worm axially in one direction in order to avoid backlash when fine tuning.

7. A tuner as defined in claim 6, in which each cam has trunnions on the axis of which it may be angularly adjusted, and in which the trunnions are received in open-ended bearings formed on the turret, and in which the turret has resilient means urging the trunnions against the closed end of the said bearings.

8. A tuner as defined in claim 7, in which the turret has a shaft which has spaced necked journals beyond each end of the turret, one of said journals having one sloping side and said journals being received in bearing holes formed in the end plates of a frame, one of said bearing holes being somewhat keyhole shaped, and in which a stiff spring wire bears resiliently against the sloping side of said one necked journal and urges it toward the small end of its bearing in order to eliminate bearing clearance in both radial and axial direction.

9. A tuner as defined in claim 8, in which the turret has a detent disc with a scalloped periphery, and in which a spring pressed ball bears against the periphery of the disc in order to index the same, and in which the said ball is somewhat offset in axial direction from the disc so that the ball exerts an axial force in order to eliminate the effect of axial clearance in the position of the turret shaft.

10. A tuner as defined in claim 8, in which the tuning element is a ganged capacitor located behind the turret mechanism, and the shaft of which is generally parallel to but offset from the turret shaft, and in which the rocker has a bevel gear meshing with a bevel pinion on the shaft of the ganged capacitor, and in which the said bevel gearing has a step-up ratio such that rocking of the rocker over a small angle of say 60° turns the capacitor over an angle of about 180°.

11. A tuner as defined in claim 10, in which the shaft of the ganged capacitor is extended forwardly through the frame of the turret mechanism in order to actuate a channel indicator located in front of the turret mechanism and behind the turret knob and the fine turning knob.

12. A tuner as defined in claim 1, in which the inner part of each cam has a worm gear sector meshing with a worm carried by the turret, each of said woms having a gear, and in which there is a fine tuning knob and a train of reduction gearing driven thereby for engaging the gear of that worm whose cam is then engaging the rocker.

13. A tuner as defined in claim 12, in which the turret has a turret shaft with a turret knob, and in which there is a fine tuning knob behind the turret knob and mounted on a sleeve around the turret shaft, and in which the said train of reduction gearing is driven by said sleeve, and includes means such that the gearing is normally disengaged but is automatically brought into engagement when the fine tuning knob is operated.

14. A tuner as defined in claim 1, in which each cam has two angularly related sides disposed at an obtuse angle, and in which one cam follower of the rocker is solid and the other is sprung, and in which the rocker has resilient means urging the sprung cam follower toward the solid cam follower in order to avoid lost motion between the cams and cam followers.

15. A tuner as defined in claim 12, in which the turret is provided with resilient means urging each worm axially in one direction in order to avoid backlash when fine tuning.

16. A tuner as defined in claim 1, in which each cam has trunnions on the axis of which it may be angularly adjusted, and in which the trunnions are received in open-ended bearings formed on the turret, and in which the turret has resilient means urging the trunnions against the closed end of the said bearings.

17. A tuner as defined in claim 1, in which the turret has a shaft which has spaced necked journals beyond each end of the turret, one of said journals having one sloping side and said journals being received in bearing holes formed in the end plates of a frame, one of said bearing holes being somewhat keyhole shaped, and in which a stiff spring wire bears resiliently against the sloping side of said one necked journal and urges it toward the small end of its bearing in order to eliminate bearing clearance in both radial and axial direction.

18. A tuner as defined in claim 1, in which the turret has a detent disc with a scalloped periphery, and in which a spring pressed ball bears against the periphery of the disc in order to index the same, and in which the said ball is somewhat offset in axial direction from the disc so that the ball exerts an axial force in order to eliminate the effect of axial clearance in the position of the turret shaft.

19. A tuner as defined in claim 1, in which the tuning element is a ganged capacitor located behind the turret mechanism, and the shaft of which is generally parallel to but offset from the turret shaft, and in which the rocker has a bevel gear meshing with a bevel pinion on the shaft of the ganged capacitor, and in which the said bevel gearing has a step-up ratio such that the rocking of the rocker over a small angle of say 60° turns the capacitor over an angle of about 180°.

20. A tuner as defined in claim 19, in which the shaft of the ganged capacitor is extended forwardly through the frame of the turret mechanism in order to actuate a channel indicator located in front of the turret mechanism and behind the turret knob and the fine tuning knob.

21. A tuner as defined in claim 1, in which the inner part of each cam has a worm gear sector meshing with a worm carried by the turret for adjustment of the angular position of the cam, and in which the cam bearings have radial clearance whereby the teeth of that sector which is engaging the rocker may be pressed into the teeth of its adjusting worm during such an engagement with the rocker.

References Cited

UNITED STATES PATENTS

| | | | |
|---|---|---|---|
| 3,172,062 | 3/1965 | Valdettaro et al. | 74—10.6 X |
| 3,205,720 | 9/1965 | Smith | 74—10.8 |
| 3,244,012 | 4/1966 | Ma et al. | 74—10.8 |

MILTON KAUFMAN, *Primary Examiner.*

U.S. Cl. X.R.

74—10.45, 10.54, 10.8; 334—51